United States Patent [19]

Anderson

[11] 4,301,375
[45] Nov. 17, 1981

[54] TURBO-GENERATOR UNIT AND SYSTEM

[75] Inventor: J. H. Anderson, York, Pa.

[73] Assignee: Sea Solar Power, Inc., York, Pa.

[21] Appl. No.: 109,120

[22] Filed: Jan. 2, 1980

[51] Int. Cl.³ .......................... F03G 7/04; H02K 9/10
[52] U.S. Cl. ..................................... 290/1 R; 290/52;
310/53; 310/58; 60/641.7
[58] Field of Search ............... 290/1, 52; 60/641, 398;
310/53, 58

[56] References Cited

U.S. PATENT DOCUMENTS 3,024,366 1/1958 Yanagimachi ..................... 310/55
3,312,054 4/1967 Anderson et al. .................. 310/306
3,409,782 10/1965 Bronicki ............................. 290/52

*Primary Examiner*—J. D. Miller
*Assistant Examiner*—D. L. Rebsch
*Attorney, Agent, or Firm*—Cushman, Darby & Cushman

[57] ABSTRACT

An improved turbo-generator unit for a sea power plant having a wall separating the sea from a space at atmospheric pressure has the turbine submerged in the sea on one side of the wall, the generator in the atmospheric space and a common shaft sealingly extending through the wall. The turbine motive fluid is a halocarbon vapor while the generator is cooled with a halocarbon refrigerant having a closed circuit which includes a fluid-tight generator housing.

18 Claims, 2 Drawing Figures

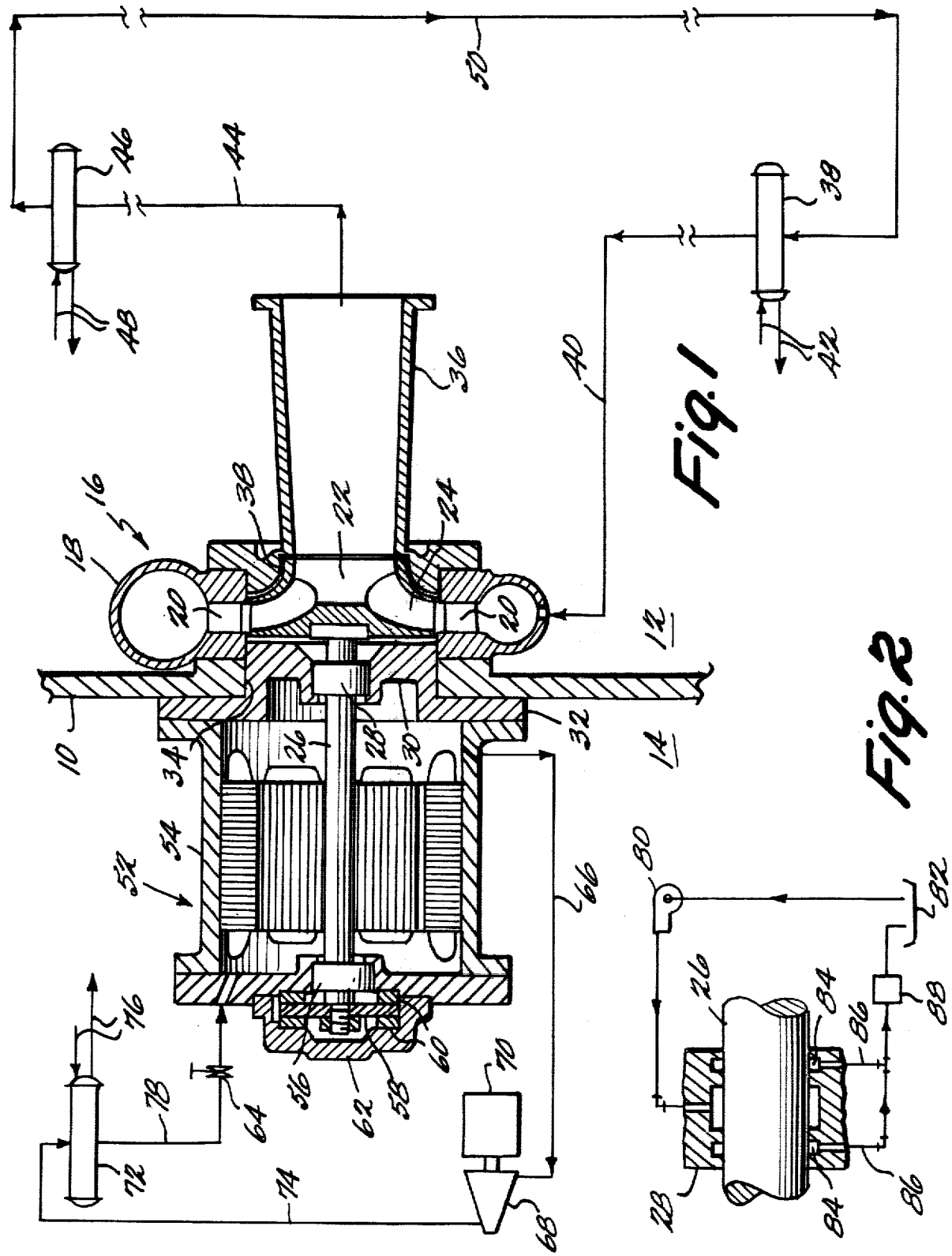

TURBO-GENERATOR UNIT AND SYSTEM

BACKGROUND OF THE INVENTION

This invention relates to improvements in turbine-driven electrical generators, i.e., turbo-generator units, and more especially to improvements in such units that are used in sea thermal power plants and to improvements in plants, such as that disclosed in prior U.S. Pat. No. 3,312,054. Such a plant usually includes a vapor-driven turbo-generator unit having a closed circuit for the motive fluid. The motive-fluid disclosed in the aforesaid patent is propane and the closed circuit therefor includes a boiler heated by warm surface sea water, the turbine of the unit, a condenser cooled by water from deep in the sea, and a pump for returning the condensed liquified propane back to the boiler. The patent discloses the turbo-generator unit to be mounted inside a floating hull with the condenser, pump and boiler suspended from the hull and submerged in the sea.

While the sea thermal power plant disclosed in the aforesaid patent is satisfactorily operative, it is susceptible to improvements for increased efficiency and economy of construction. For example, the motive fluid circuit includes a boiler feed pump which is an extra item of expense. No provision is made for cooling the generator. The turbine casing is subjected to the full pressure differential between the motive fluid and the atmosphere with the resulting need for a casing strong enough to withstand such differential.

Other patents disclose floating power plants having vapor-driven turbo generator units which make use of the outside water to cool and condense the turbine exhaust vapor for gravity return to the boiler. Such patents, for example, are U.S. Pat. Nos. 3,449,589 and 3,541,342. Both patents, however, disclose mercury as the turbine motive fluid and a fuel source for heating the boiler rather than warm sea water. Further, U.S. Pat. No. 3,024,366 discloses a vapor-driven turbo generator unit that uses Freon-11 as the motive fluid, a fuel fired boiler, a condenser, and a boiler feed pump. The unit is enclosed in a fluid-tight housing and a portion of the motive-fluid is bled off, between the pump and the boiler, and led through an expansion valve into the housing to cool the generator. The heat source for the boiler, however, is not warm sea water, nor is cold sea water used to cool the condenser.

SUMMARY OF THE INVENTION

Accordingly, it is an object of this invention to provide an improved vapor-driven turbo-generator unit especially adapted for use in sea thermal power plants.

It is another object of this invention to provide such a unit wherein the turbine is submerged in the sea with a resultingly reduced pressure differential across the turbine housing so that the latter need not be as strong as usual with resulting economies of manufacture.

It is another object of this invention to provide such a unit wherein the motive fluid is a halocarbon and the generator is cooled by a halocarbon refrigerant in a circuit separate from the motive fluid for the turbine.

It is another object of this invention to provide such a unit wherein the motive fluid is a halocarbon that is cooled and condensed and returned by gravity to the boiler without the necessity for a boiler feed pump.

The foregoing objects are accomplished by providing a vapor-driven turbo-generator unit that has the turbine submerged in the sea on one side of a wall that separates the sea from a space at atmospheric pressure. The generator is located in the space with one end of the generator shaft sealingly extending through the wall and mounting the turbine wheel. The generator has a fluid-tight housing into which a halocarbon refrigerant is sprayed to cool the generator, the housing being part of a closed circuit for the refrigerant. The motive fluid for the turbine also is a halocarbon, the turbine exhause vapor being fed to a condenser, cooled by water from deep in the sea, located above the turbine and the condensed refrigerant fed by gravity to a boiler, warmed by surface sea water, located below the turbine.

Other objects and advantages of the invention will become apparent from the following description and accompanying drawings in which:

BRIEF DESCRIPTION OF THE DRAWINGS

FIG. 1 is a partially schematic cross-sectional view of a turbo-generator unit and system embodying this invention.

FIG. 2 is an enlarged fragmentary sectional view of the radial bearing shown in FIG. 1 between the generator and the turbine.

DETAILED DESCRIPTION OF THE INVENTION

Referring now to FIG. 1 of the drawings, there is shown a portion of the outside wall 10 of a hull of a floating sea thermal power plant such as that disclosed in U.S. Pat. No. 3,312,054. The wall 10, which may be vertical as shown or horizontal, separates the sea 12 from the interior of the hull, i.e., a space 14 usually at atmospheric pressure. A turbine 16 is submerged in the sea 12 at a depth of as much as 150 feet below the surface and is secured to the wall 10 by any conventional means, e.g., bolts, not shown. The turbine 16 preferably is of the radial nozzle type provided with an inlet scroll 18 having its axis perpendicular to the wall 10. The scroll 18 has a plurality of inwardly directed turbine nozzles 20 formed by fixed vanes spanning the opposite edges of the scroll.

A turbine wheel 22 having a circumferential array of turbine blades 24 is mounted on one end of a shaft 26 that extends through the wall 10 into the interior of the hull. Adjacent the wheel 22 the shaft is supported in a radial bearing 28 sealed to and carried in a bearing support 30 having a peripheral flange 32 within the space 14 and sealed to and overlying the marginal edge portion of an opening 34 in the wall 10 preferably large enough for the wheel 22 to pass through. The flange 32 is detachably secured to the wall 10 by any suitable means, e.g., bolts, not shown. The turbine exhaust diffuser 36 extends away from the wall 10 into the sea 12 with its inner end portion closely surrounding a coaxial outer surface on the wheel 22. The diffuser 30 is secured to the scroll 18 by any suitable means, e.g., bolts, not shown.

The motive fluid for the turbine preferably is a halocarbon refrigerant, such as R-22 (chlorodifluoromethane) fed to the inlet scroll 18 from a boiler 38 by a line 40. The boiler 38, which is of the heat exchanger type, desirably is located in the sea 12 below the turbine 16 and is heated by warm surface sea water circulated into and out of the boiler, via pipes 42, as disclosed in the aforesaid U.S. Pat. No. 3,312,054. The turbine exhaust vapor is led from the diffuser 36 via a line 44 to a condenser 46 desirably located in the sea 12 above the turbine 16, where the vapor is cooled and condensed to a liquid by cold water from deep in the sea that is circulated into and out of the condenser via pipes 48 as also disclosed in said U.S. Pat. No. 3,312,054. From the condenser 46 the liquid motive fluid is fed by gravity back to the boiler 38 via a line 50. Such gravity feed of the boiler 38 is much more efficient than a pump feed and accordingly improves the cycle efficiency of the plant.

As described in the aforesaid U.S. Pat. No. 3,312,054, it is advantageous to locate the condenser 46 above the boiler 38, but to have both of these units submerged in the sea 12 in order to reduce the pressure differential between the motive fluid in these units and that outside. In other words, the increased exterior pressure, obtained by submerging these units in the sea 12, substantially reduces that pressure differential so that the boiler 38 and condenser 46 can be of lighter and weaker construction with consequent manufacturing economies. Submergence of the turbine 16 in the sea produces the same advantages, i.e., the turbine scroll 18 may be of lighter construction with consequent manufacturing economies. In this connection, the lowered pressure differential across the scroll 18 has the further advantage of permitting a reduction in strength of the turbine nozzles or stator vanes 20 which act as tension members to hold the edges of the scroll 18 together. A high pressure differential requires the turbine nozzles to be made of heavy thick material which occupies more space and tends to make the turbine less efficient than where the turbine nozzles can be made of thinner material, as is the situation here. Because of such permissible reduction in weight and strength, the turbine 16 can be simple in design and have only a single wheel 22 which can be made satisfactorily from cast aluminum. Submergence of the turbine 16 in the sea 12 has the further advantage of reducing the noise of the turbine in the atmospheric space 14 where workmen are frequently in attendance.

Disposed in the atmospheric space 14 is an electric generator 52 of the induction or synchronous type having its rotating parts mounted on the shaft 26 and its stator parts fastened to the inside of a fluid-tight housing 54 which includes the bearing support 30. The end of the shaft 26 opposite the turbine wheel 22 is mounted in a radial bearing 56 supported in the corresponding end wall of the housing 54 and outwardly of the radial bearing 56 the shaft is provided with a thrust collar 58 engageable between thrust bearings 60 enclosed in an imperforate end cap 62.

The arrangement of the turbine 16 and the generator 52 to have a common shaft 26 provided with only two radial bearings 28 and 56 not only reduces the cost of construction of the turbo-generator unit but also makes for an arrangement wherein the bearing 56 need have no seal because the corresponding end of the shaft is totally enclosed and does not project into the atmospheric space 14. Furthermore, the fluid-tight housing 54 for the generator 52 makes it possible to cool the same by a refrigerant of low pressure and density or weight and which has dielectric non-explosive properties. Although it is known to use hydrogen for generator cooling purposes, it is explosive when mixed with air. Consequently, hydrogen presents excessive potential hazards. Further, although it is known, as mentioned above, to use the refrigerant Freon for cooling a generator, the arrangement shown in the above-mentioned U.S. Pat. No. 3,024,366 necessitates the use of a fan in the generator housing to assure circulation of the Freon refrigerant over the generator rotor and stator parts and to exhaust the refrigerant from the housing.

Preferably, the refrigerant used here is a halocarbon, desirable R-11 (trichlorofluoromethane). The liquid refrigerant is sprayed into the housing 54 through an expansion valve 64 so that its evaporation within the housing cools the active generator parts. The refrigerant vapor is removed from the housing 54 through a line 66 to a conventional compressor 68 driven by an appropriate type of motor 70. From the compressor 68, the refrigerant is fed to a condenser 72, via a line 74, which is cooled by cold water from deep in the sea that flows into and out of the condenser via pipes 76. The cooled liquid refrigerant is then conducted to the expansion valve 64 via a line 78.

Use of a refrigerant sprayed into the generator housing 54 in liquid form not only cools the generator 52 but also reduces its temperature sufficiently to reduce the electrical resistance of the generator windings, usually made of copper, thereby reducing electrical resistance losses and making for greater generator efficiency. Moreover, by using a refrigerant of relatively low pressure and density, windage losses in the generator 52, due to the friction of the cooling fluid with the rotating parts, is also reduced. Further, as mentioned before, R-11, or similar halocarbon refrigerants, not only are non-flammable or non-explosive but also have good dielectric resistance. Accordingly, the electrical wiring associated with the generator 52 need not be explosion proof with resultant manufacturing economies. Moreover, although there is illustrated and described herein only a simple single stage refrigeration system, even lower temperature refrigeration can be produced by multi-staging or cascading the refrigeration system as is well known in the art. Accordingly the design of the refrigeration system should be optimized to minimize windage and electrical resistance losses.

It also will be noted that because the turbine wheel 22 can be passed through the opening 34 in the wall 10, the entire generator housing 54, with the turbine wheel on one end of the shaft 26, can be mounted in place with the turbine wheel then in its proper location within the turbine inlet scroll 18. Similarly, the entire generator 52, together with the turbine wheel 22, can readily be removed for repair without removing the turbine inlet scroll 18 and the turbine exhaust diffuser 36.

The interior of the generator housing 54 is separated from the interior of the turbine 16 by the bearing support 32, the bearing 28, and the shaft 26. Accordingly, the bearing 28 should be sealed and may be supplied with lubricating oil via a pump 80 which withdraws oil from a suitable sump 82 and supplies it to the bearing, as shown in FIG. 2. Circumferential grooves 84 between the opposed surfaces of the bearing 28 and the shaft 26 on opposite sides of the point of introduction of the lubricant are vented, via radial ports, to return lines 86 leading back to the sump. Manifestly, however, the lubricating liquid will absorb some of the halocarbon vapor within the generator housing 54 and some of the halocarbon vapor from the interior of the turbine 16. The lubricant in the return lines 86 can be purged of those halocarbons by any appropriate purge system 88, that are conventional in the refrigeration art. Accordingly, the sealing system for the bearing 28 is relatively simple and similar to that used in conventional hermetic refrigeration compressors.

It thus will be seen that the objects and advantages of this invention have been fully and effectively achieved. It will be realized, however, that the foregoing specific embodiment has been disclosed only for the purpose of illustrating the principles of this invention and is susceptible of modification without departing from such principles. Accordingly, the invention includes all embodiments encompassed within the spirit and scope of the following claims.

I claim:

1. A turbo-generator unit for use in a sea thermal power plant having a wall separating the sea from an atmospheric space at a pressure lower than that of the sea at the depth at which said unit is located, comprising:
   electrical generator means including housing means adapted to be located in the atmospheric space;
   turbine means including a scroll and a wheel adapted to be located in the sea water;
   a shaft common to said generator means and said turbine means;
   two radial bearing means for said shaft, one between said generator means and said turbine means; and
   supporting means for said one bearing means comprising a part of said housing means and adapted to be detachably mounted to the wall and to close and seal an opening therein larger than said wheel, whereby said generator means and said wheel can be installed in and removed from the atmospheric space as a unit.

2. The unit defined in claim 1 including thrust bearing means adjacent the other radial bearing means.

3. The unit defined in claim 1 wherein the housing means is fluid-tight.

4. The unit defined in claim 3 including refrigerant means for cooling the generator means.

5. The unit defined in claim 4 including a refrigerant circuit comprising in series a compressor, a condenser, an expansion valve, and the housing means.

6. The unit defined in claim 4 in which the refrigerant is a halocarbon.

7. The unit defined in claim 6 in which the refrigerant is R-11.

8. In a sea thermal power plant the combination comprising:
   a turbo-generator unit located beneath the surface of the sea; and
   a motive fluid circuit for the turbine means of said unit including:
   boiler means located in the sea below said unit; and
   condenser means located in the sea above said unit for gravity flow of condensed liquified vapor to the boiler means.

9. The combination defined in claim 8 in which the motive fluid is a halocarbon vapor.

10. The combination defined in claim 9 in which the motive fluid is R-22.

11. The combination defined in claim 8 including:
    a wall separating the sea from a space at atmospheric pressure; and wherein
    the turbine means of the unit is submerged in the sea on one side of said wall, and
    the generator means of the unit is located in the space on the other side of said wall.

12. The combination defined in claim 11 including refrigerant means for cooling the generator.

13. In a turbo-generator unit, the combination comprising:
    turbine means;
    a motive fluid circuit for said turbine means;
    an electrical generator of one of the synchronous and induction types having a rotor driven by said turbine means and a stator enclosed in a fluid-tight housing; and
    means for cooling said generator including a refrigerant circuit separate from and independent of said motive fluid circuit comprising in series a compressor, a condensor, an expansion valve and said housing.

14. The combination defined in claim 13 in which the refrigerant is a halocarbon.

15. The combination defined in claim 14 in which the refrigerant is a low pressure, low density halocarbon.

16. The combination defined in claim 15 in which the refrigerant is R-11.

17. In a sea thermal power plant, the combination comprising:
    a wall separating the sea from a space at atmospheric pressure;
    a turbo-generator unit having turbine means submerged in the sea on one side of said wall, electrical generator means located in the space on the other side of said wall, and a common shaft sealingly extending through said wall.

18. The combination defined in claim 17 including:
    two radial bearing means for the shaft, one between the generator means and the turbine means; and
    a support for said one bearing means mounted in the wall.

* * * * *